(12) United States Patent
Wisniewski

(10) Patent No.: US 8,395,589 B2
(45) Date of Patent: Mar. 12, 2013

(54) PRESS ON POWER-UP DETECTION FOR A TOUCH-SENSOR DEVICE

(75) Inventor: John Anthony Wisniewski, Plymouth Meeting, PA (US)

(73) Assignee: Cypress Semiconductor Corporation, San Jose, CA (US)

( * ) Notice: Subject to any disclaimer, the term of this patent is extended or adjusted under 35 U.S.C. 154(b) by 881 days.

(21) Appl. No.: 12/260,843

(22) Filed: Oct. 29, 2008

(65) Prior Publication Data

US 2009/0114456 A1    May 7, 2009

Related U.S. Application Data

(60) Provisional application No. 60/984,962, filed on Nov. 2, 2007.

(51) Int. Cl.
*G06F 3/041* (2006.01)
(52) U.S. Cl. ....................................................... 345/173
(58) Field of Classification Search ........... 345/173–179
See application file for complete search history.

(56) References Cited

U.S. PATENT DOCUMENTS

| | | | |
|---|---|---|---|
| 4,733,222 A | 3/1988 | Evans | |
| 5,523,775 A | 6/1996 | Capps | |
| 5,543,590 A | 8/1996 | Gillespie et al. | |
| 5,553,296 A | 9/1996 | Forrest et al. | |
| 7,504,833 B1 * | 3/2009 | Seguine | 324/672 |
| 8,072,230 B1 | 12/2011 | Seguine | |
| 2005/0012723 A1 * | 1/2005 | Pallakoff | 345/173 |
| 2008/0136792 A1 * | 6/2008 | Peng et al. | 345/174 |
| 2009/0009195 A1 | 1/2009 | Seguine | |
| 2009/0079444 A1 * | 3/2009 | Khapochkin et al. | 324/688 |
| 2010/0060608 A1 | 3/2010 | Yousefpor | |
| 2010/0149127 A1 | 6/2010 | Fisher et al. | |
| 2011/0006832 A1 | 1/2011 | Land et al. | |
| 2011/0012840 A1 | 1/2011 | Hotelling et al. | |
| 2011/0175823 A1 | 7/2011 | Vieta | |
| 2011/0241907 A1 | 10/2011 | Cordeiro | |

FOREIGN PATENT DOCUMENTS

TW    201015412    4/2010

OTHER PUBLICATIONS

International Search Report of International Searching Authority, dated Jan. 8, 2009 for International Application No. PCT/US08/12393; 2 pages.
International Written Opinion of International Searching Authority, dated Jan. 8, 2009 for International Application No. PCT/US08/12393; 5 pages.
U.S. Appl. No. 13/429,878: "Negative Touch Recovery for Mutual Capacitance Scanning Systems," Dennis Wavomba, filed on Mar. 26, 2012; 23 pages.
"The Patent Wars' Apple Reveals New High-End Multi-Touch Technology", Dated Mar. 12, 2010; 9 pages.
U.S. Appl. No. 60/984,962 "Set Top Box Division," John Wisniewski et al., filed on Nov. 2, 2007; 5 pages.
U.S. Appl. No. 61/512,794 "Negative Touch Recovery for Mutual Capacitance Sensors," Dennis Wavornha et al., filed on Jul. 28, 2011, 11 pages.
International Search Report for International Application No. PCT/US08/12393 dated Jan. 8, 2009, 2 pages.
Sachin Gupta et al; "Designine Reliable Capacitive Touch Interfaces" Dated Sep. 8, 2011, 7 pages.
Written Opinion of the International Searching Authority for International Application No. PCT/US08/12393 mailed Jan. 8, 2009; 5 pages.

* cited by examiner

*Primary Examiner* — Waseem Moorad

(57) ABSTRACT

A method and apparatus to determine during a power-up of an electronic system whether a conductive object is present at a sensing device at the power-up.

18 Claims, 7 Drawing Sheets

PRESS ON POWER-UP DETECTION FOR A TOUCH-SENSOR DEVICE

RELATED APPLICATIONS

This application claims the benefit of U.S. Provisional Application No. 60/984,962 filed on Nov. 2, 2007.

TECHNICAL FIELD

This disclosure relates to the field of user interface devices and, in particular, to touch-sensing devices.

BACKGROUND

Computing devices, such as notebook computers, personal data assistants (PDAs), mobile communication devices, portable entertainment devices (such as handheld video game devices, multimedia players, and the like) and set-top-boxes (such as digital cable boxes, digital video disc (DVD) players, video cassette recorders, and the like) have user interface devices, which are also known as human interface devices (HID), that facilitate interaction between the user and the computing device. One type of user interface device that has become more common is a touch-sensor device that operates by way of capacitance sensing. A touch-sensor device usually is in the form of a touch-sensor pad, a touch-sensor slider, or touch-sensor buttons, and includes an array of one or more capacitive sensors. The capacitance detected by a capacitive sensor changes as a function of the proximity of a conductive object to the sensor. The conductive object can be, for example, a stylus or a user's finger.

In a touch-sensor button, a change in capacitance detected by a sensor due to the proximity of a conductive object can be measured by a variety of methods. Regardless of the method, usually an electrical signal representative of the capacitance detected by the capacitive sensor is processed by a processing device, which in turn develops electrical signals representative of the presence of the conductive object in proximity to the touch-sensor button.

BRIEF DESCRIPTION OF THE DRAWINGS

The present disclosure is illustrated by way of example, and not by way of limitation, in the figures of the accompanying drawings.

DETAILED DESCRIPTION

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Embodiments of a method and apparatus are described to detect the presence of a conductive object on a sensing device implemented in a computing device and to determine if the conductive object is present during a power-up of the computing device. In one embodiment, the method includes measuring a baseline capacitance value of a target touch-sensor button and of one or more secondary touch-sensor buttons, determining a difference between the baseline capacitance value of the target touch-sensor button and the baseline capacitance value of the secondary touch-sensor buttons, and determining that the conductive object is present if the difference is greater than a button threshold value.

Figure 1:
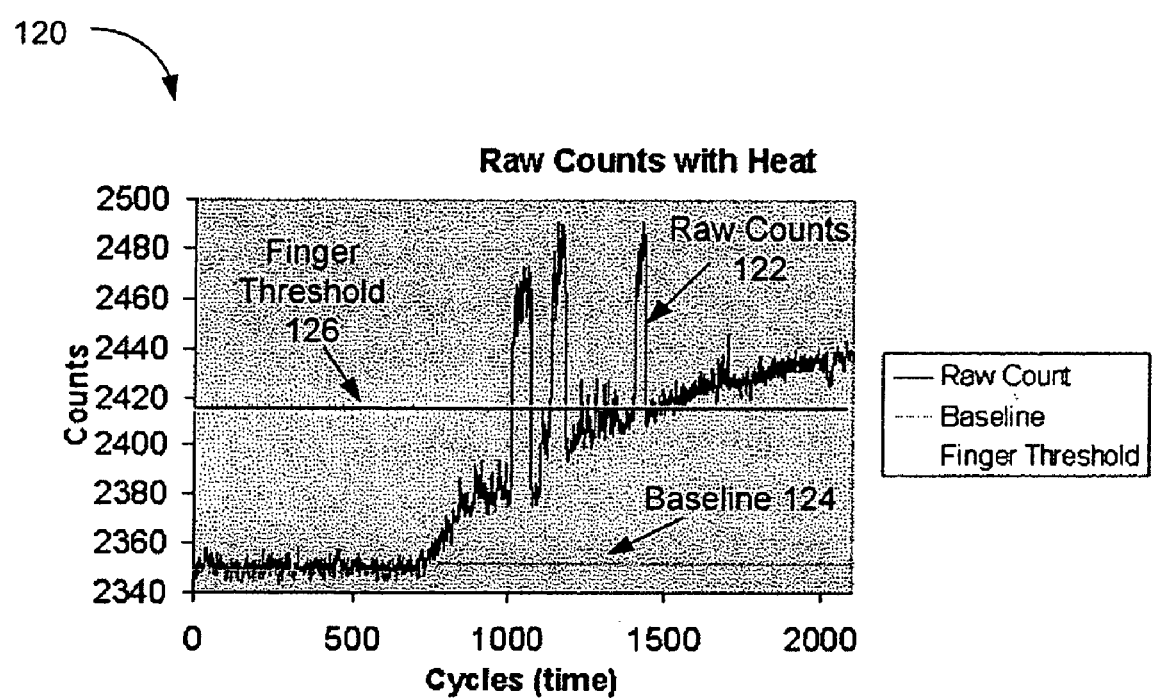
FIG. 1 illustrates a graph of detection of a conductive object on the capacitance measured by a capacitive sensor according to an embodiment.

With capacitive sensors, capacitance is measured in terms of raw counts (e.g., the higher the capacitance the higher the raw counts). When a conductive object comes in proximity to the capacitive sensor the raw counts increase. Referring to graph 120 of FIG. 1, a reference, or baseline 124, is tracked. The computing device can tell if user interaction is present (e.g., finger on button) by comparing the raw counts 122 (representing the capacitance due to the presence of a conductive object, such as user's finger) to the baseline value 124 which represents the absence of a conductive object. If the raw count value 122 exceeds the baseline value 124 by a finger threshold 126, user interaction is deemed to be present and appropriate actions are taken. In one embodiment, the baseline 124 may be established immediately after power-on by taking the average count value over a period of time. The baseline may be periodically updated to take into account external changes such as temperature and humidity. The finger threshold may track the updated baseline to also account for these changes.

Figure 2:
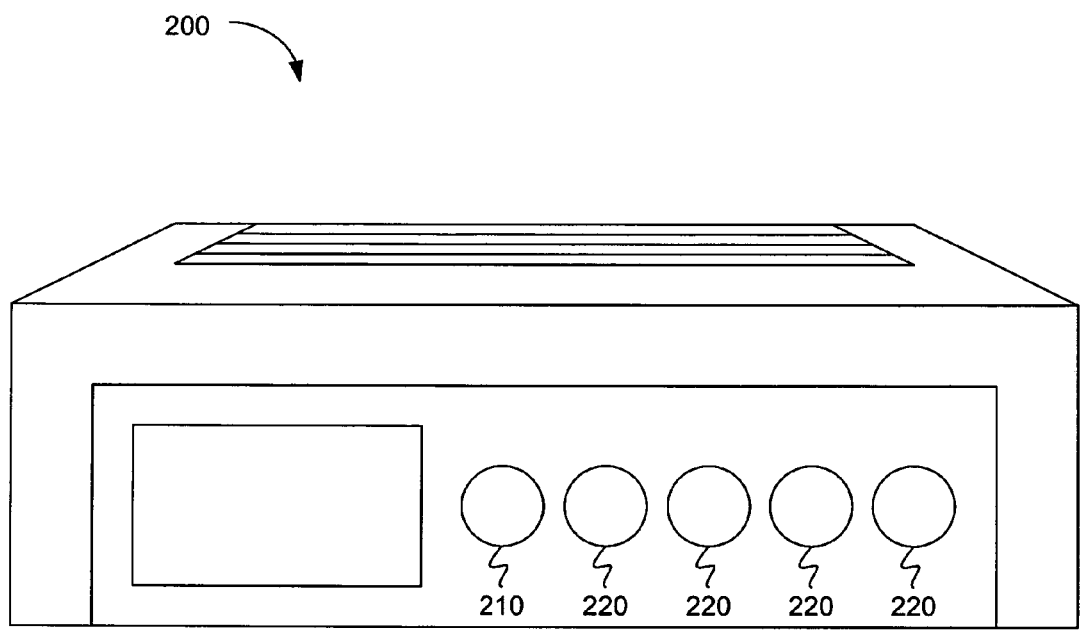
FIG. 2 illustrates an electronic system implementing a plurality of capacitive-sensing buttons according to one embodiment of the present invention.

FIG. 2 illustrates an electronic system implementing a plurality of capacitive-sensing buttons according to one embodiment of the present invention. Electronic system 200 is representative of any computing device such as a notebook computer, a personal data assistant (PDA), a mobile communication device, a portable entertainment device, a set top box, or other computing device that may implement a user interface device. In one embodiment the user interface device is a touch-sensor device such as a capacitive sensing button. In alternative embodiments, other types of user interface devices are used such as a touch-sensor pad, touch-sensor slider, or the like. In this embodiment the touch-sensor device includes a plurality of capacitive-sensing buttons including primary button 210 and secondary buttons 220. In this embodiment, primary button 210 is the target button, however in alternative embodiments any button may be used as the target button.

Target button 210 is the button of the plurality of buttons that if pressed within a certain time period of a power-up of electronic system 200 will cause electronic system 200 to take certain actions. In one embodiment, for example, if target button 210 is pressed within 200 ms of power-up, computing device will enter a diagnostic mode. A user may hold down the power button while plugging in the power cord. In such a case the baseline value of the button has not been established prior to the user's finger being present on the button. Thus, when the raw counts are sampled, the raw counts are equal to the baseline. Since there is no difference between the raw counts and the baseline, the button threshold is not met and the computing device does not sense any user interaction. Once the user's finger is removed the raw counts for the button will decrease and the system may retroactively determine that a finger was removed from a given sensor. Thus, the user's finger is determined to have been removed in a second time period occurring after the first time period (e.g., 200 ms). In alternative embodiments, other time-periods may be used or other actions may be taken. For instance, the system may have the user wait for the computing device to establish a baseline value and then detect for button press, which does not allow for sensing a finger on a touch-sensor button at power-up of the device.

Figure 3:
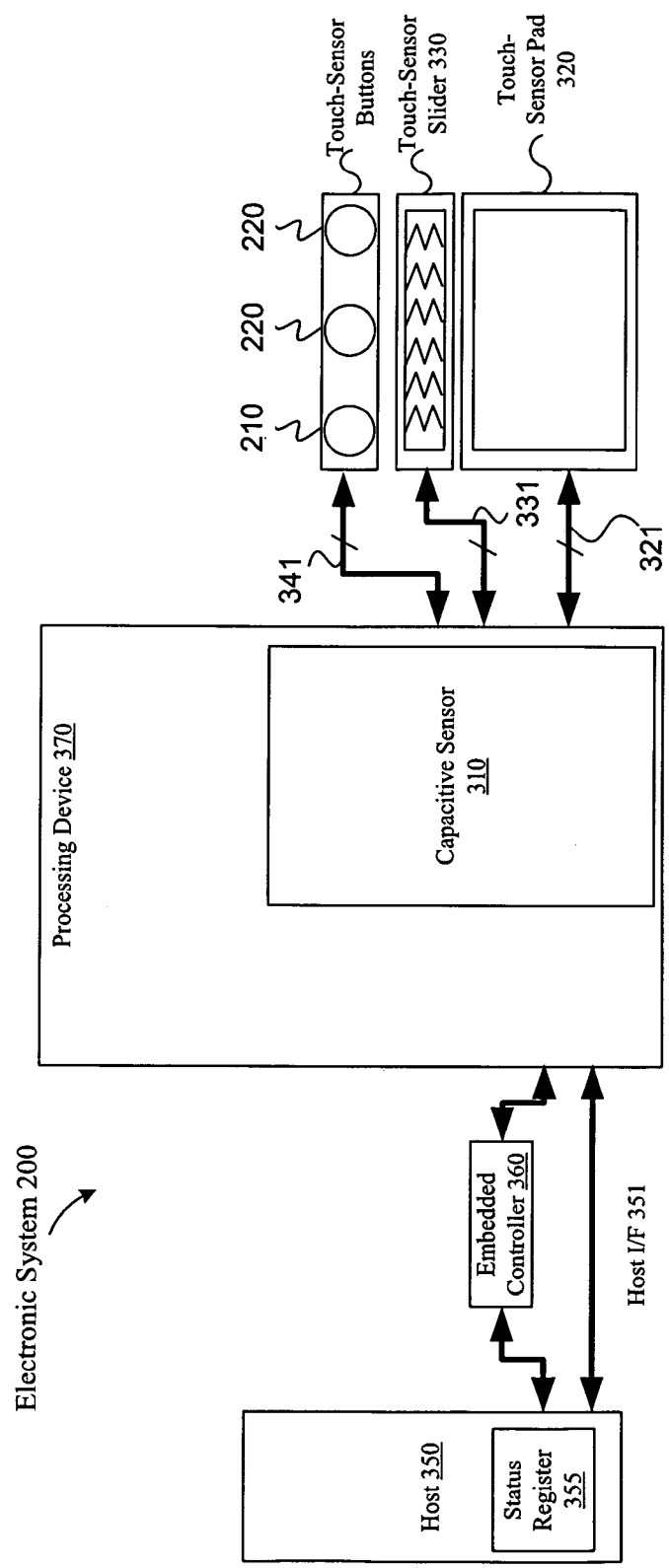
FIG. 3 illustrates a block diagram of one embodiment of an electronic system having a processing device for detecting a presence of a conductive object.

FIG. 3 illustrates a block diagram of one embodiment of an electronic system having a processing device for detecting a presence of a conductive object. Electronic system 200 includes processing device 370, touch-sensor pad 320, touch-sensor slider 330, touch-sensor buttons 210, 220, host processor 350, and embedded controller 360. As illustrated, capacitive sensor 310 may be integrated into processing device 370. Capacitive sensor 310 may include analog I/O for coupling to an external component, such as touch-sensor pad 320, touch-sensor slider 330, touch-sensor buttons 210, 220, and/or other devices.

In one embodiment, the electronic system 200 includes touch-sensor buttons 210, 220 coupled to the processing device 370 via bus 341. Each touch-sensor button 210, 220 may include one or more sensor elements. For a touch-sensor button, the one or more sensor elements may be coupled together to detect a presence of a conductive object over the entire surface of the sensing device. Alternatively, each touch-sensor button 210, 220 has a single sensor element to detect the presence of the conductive object. In one embodiment, each touch-sensor button 210, 220 may be a capacitive sensor element. Capacitive sensor elements may be used as non-contact switches. In one embodiment, touch-sensor buttons 210, 220 send signals to processing device 370 representing capacitance measured by touch-sensor buttons 210, 220. In an alternative embodiment, the electronic system 200 includes a touch-sensor slider 330 coupled to the processing device 370 via bus 331. In another embodiment, the electronic system 200 includes a touch-sensor pad 320 coupled to the processing device 370 via bus 321.

The electronic system 200 may include any combination of one or more of the touch-sensor pad, a touch sensor screen, a touch-sensor slider, and touch-sensor buttons. In one embodiment, buses 321, 331 and 341 may be a single bus. Alternatively, the bus may be configured into any combination of one or more separate signals or buses.

In one exemplary embodiment, processing device 370 may be the Programmable System on a Chip (PSoC®) processing device, developed by Cypress Semiconductor Corporation, San Jose, Calif. Alternatively, processing device 370 may be one or more other processing devices known by those of ordinary skill in the art, such as a microprocessor or central processing unit, a controller, special-purpose processor, digital signal processor (DSP), an application specific integrated circuit (ASIC), a field programmable gate array (FPGA), or the like. In an alternative embodiment, for example, the processing device may be a network processor having multiple processors including a core unit and multiple microengines. Additionally, the processing device may include any combination of general-purpose processing device(s) and special-purpose processing device(s). Processing device 370 may communicate with an external component, such as a host processor 350, via host interface (I/F) line 351. In one embodiment, host processor 350 includes status register 355. In one example, if processing device 370 determines that a conductive object is present on target touch sensor button 210, processing device 370 sends instructions to update status register 355 to indicate the presence of the conductive object. In an alternative embodiment, processing device 370 sends an interrupt request to host processor 350 via interface line 351 if a conductive object is present at power-up.

It should also be noted that the embodiments described herein are not limited to having a configuration of a processing device coupled to a host, but may include a system that measures the equivalent capacitance on the sensing device and sends the raw data to a host computer where it is analyzed by an application. In effect the processing that is done by processing device 370 may also be done in the host. In another embodiment, the processing device 370 is the host.

It should be noted that the components of electronic system 200 may include all the components described above. Alternatively, electronic system 200 may include only some of the components described above, or include additional components not listed herein.

It should be noted that any one of various known methods for measuring capacitance may be used, for example relaxation oscillator methods, current versus voltage phase shift measurement, resistor-capacitor charge timing, capacitive bridge divider, charge transfer, successive approximation, sigma-delta modulation, charge-accumulation circuits, field effect, mutual capacitance, frequency shift, or the like.

Figure 4A:
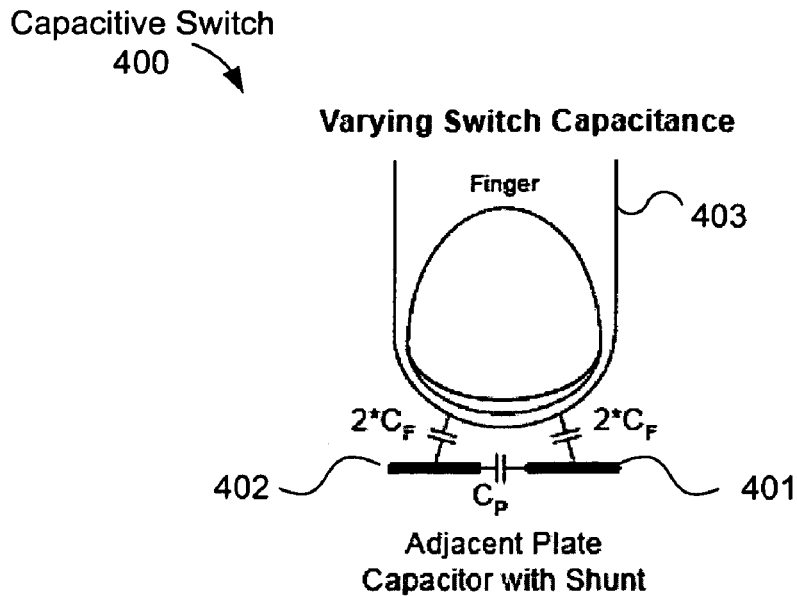
FIG. 4A illustrates one embodiment of a capacitive switch.

FIG. 4A illustrates how a conductive object may affect the capacitance of a capacitive touch-sensor device. In its basic form, a capacitive switch 400 is a pair of adjacent plates (electrodes) 401 and 402. There is a small edge-to-edge capacitance $C_p$, but the intent of switch layout is to minimize the base capacitance $C_p$ between these plates. When a conductive object 403 (e.g., a finger) is placed in proximity to the two plates 401 and 402, there is a capacitance $2*C_F$ between one electrode 401 and the conductive object 403 and a similar capacitance $2*C_F$ between the conductive object 403 and the other electrode 402. The capacitance $2*C_F$ between electrode 401 and the conductive object 403 and the capacitance $2*C_F$ between electrode 402 and the conductive object 403 add in series to yield a capacitance $C_F$. That capacitance adds in parallel to the base capacitance $C_p$ between the plates 401 and 402, resulting in a change of capacitance $C_F$ over the baseline capacitance. Capacitive switch 400 may be used in a capacitive switch array. The capacitive switch array is a set of capacitors where one electrode of each capacitor is grounded. Thus, the active capacitor has only one accessible side. The presence of the conductive object 403 increases the capacitance ($C_p+C_F$) of the capacitive switch 400 to ground. Determining switch activation is then a matter of measuring the change in the capacitance ($C_F$) or capacitance variation. Capacitive switch 400 is also known as a grounded variable capacitor. In one exemplary embodiment, $C_F$ may be in approximately a range of 10 to 30 picofarads (pF). Alternatively, other ranges may be used.

The conductive object in one embodiment is a finger, alternatively, this technique may be applied to any conductive object, for example, a conductive door switch, position sensor, or conductive pen in a stylus tracking system (e.g., stylus).

Figure 4B:
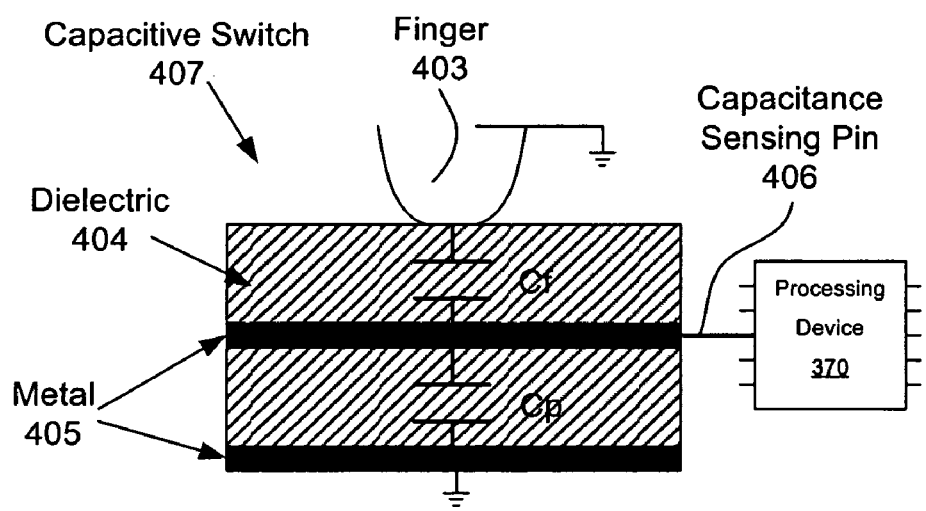
FIG. 4B illustrates one embodiment of a sensing device coupled to a processing device.

FIG. 4B illustrates one embodiment of a capacitive switch 407 coupled to a processing device 370. Capacitive switch 407 illustrates the capacitance as seen by the processing device 370 on the capacitance sensing pin 406. When a conductive object 403 (e.g., a finger) is placed in proximity to one of the metal plates 405, there is an effective capacitance, $C_F$, between the metal plate and the conductive object 403 with respect to ground. Also, there is a capacitance, $C_P$, between the two metal plates. Accordingly, the processing device 430 can measure the change in capacitance, capacitance variation $C_F$, when the conductive object is in proximity to the metal plate 405. Above and below the metal plate that is closest to the conductive object 403 is dielectric material 404. The dielectric material 404 above the metal plate 405 can be an overlay. The overlay may be non-conductive material used to protect the circuitry from environmental elements and to insulate the conductive object (e.g., the user's finger) from the circuitry. Capacitive switch 407 may be a touch-sensing switch of a touch-sensor pad, a touch-sensor slider or a touch-sensor button.

Figure 5:
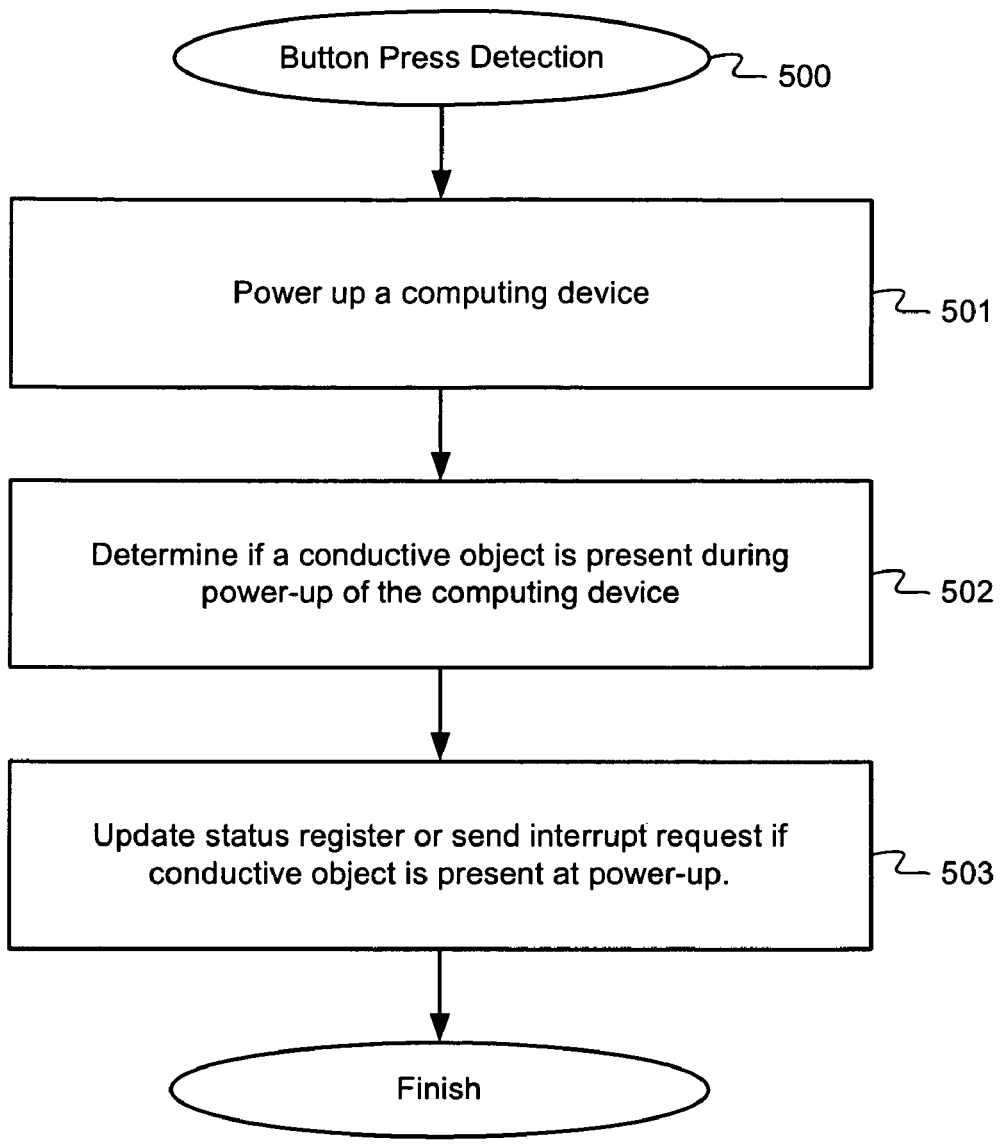
FIG. 5 is a flow diagram illustrating a method for detecting the presence of a conductive object at power-up according to one embodiment of the present invention.

FIG. 5 is a flow diagram illustrating a method for detecting the presence of a conductive object at power-up according to one embodiment of the present invention. In one embodiment the process 500 is used to determine whether a capacitive-sensing button, such as button 210 of FIG. 2, is pressed when electronic system 200 is powered-up. At block 501, process 500 powers-up an electronic system such as electronic system 200 of FIG. 2. At block 502, process 500 determines if a conductive object is present at a sensing device during power-up of the electronic system. At block 503, if a conductive object is present at power-up, process 500 initiates some activity such as, for example, updating a status register or sending an interrupt request to a host processor. In alternative embodiments process 500 may initiate some other activity.

Figure 6:
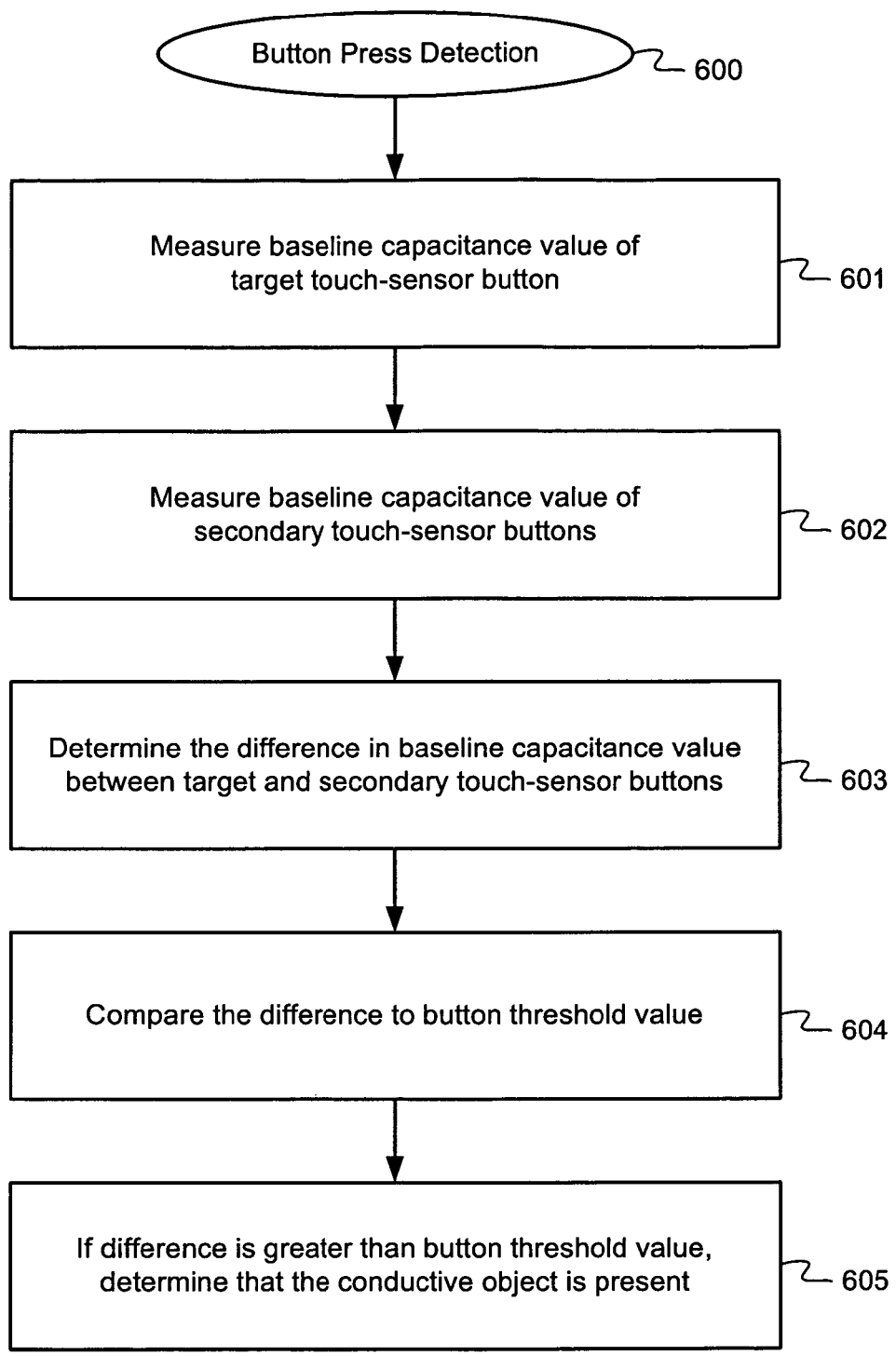
FIG. 6 is a flow diagram illustrating a method for detecting the presence of a conductive object at power-up according to one embodiment of the present invention.

FIG. 6 is a flow diagram illustrating a method for detecting the presence of a conductive object at power-up according to one embodiment of the present invention. In one embodiment the process 600 is used to determine whether a capacitive-sensing button, such as button 210 of FIG. 2, is pressed when computing device 200 is powered-up. At block 601, process 600 measures a baseline capacitance value of the target touch-sensor button. The baseline capacitance value may be determined by taking a raw count of the capacitive-sensor associated with the target button. At block 602, process 600 measures the baseline capacitance value of the secondary touch-sensor buttons. The baseline capacitance value of the secondary touch-sensor buttons may be determined in several different ways. The capacitance value of the secondary touch-sensor buttons will be discussed further below with respect to FIG. 7.

At block 603, process 600 determines the difference in baseline capacitance values between the target and secondary touch-sensor buttons. The difference may be determined using simple subtraction and an absolute value function. At block 604, process 600 compares the difference in capacitance values between the target and secondary touch-sensor buttons to a button threshold value. The button threshold value is a count value that is greater than the baseline value by an amount sufficient to indicate the presence of a conductive object. The button threshold value is set such that the presence of a conductive object (e.g., a finger) near one of the capacitive-sensing buttons would raise the raw count for that button above the button threshold.

At block 605, if the difference in capacitance values between the target and secondary touch-sensor buttons is greater that the button threshold, process 600 determines that the conductive object is present and may initiate some action. In one embodiment, the process causes the computing device to enter a diagnostic mode. In alternative embodiments, the process initiates some other action.

Figure 7:
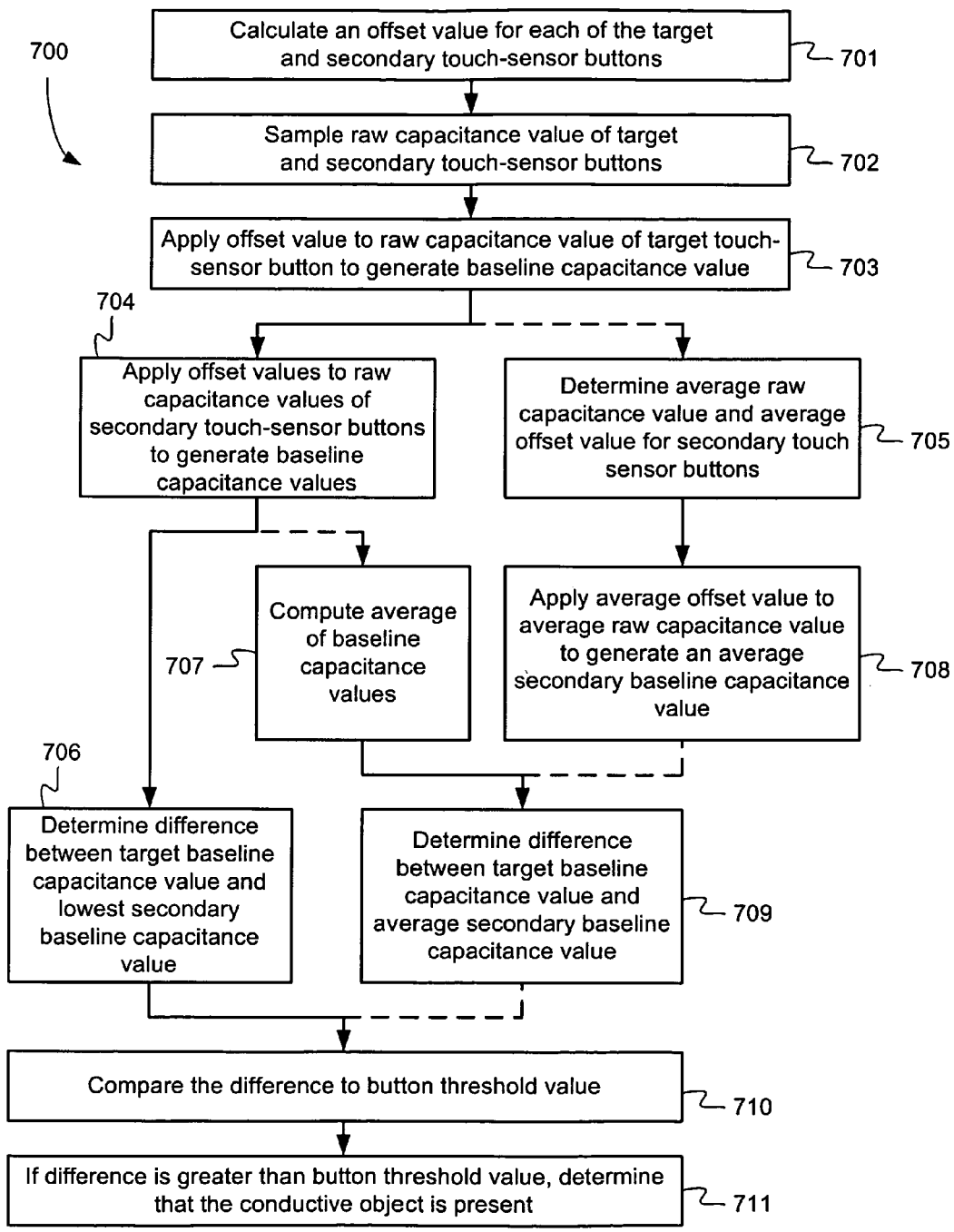
FIG. 7 is a flow diagram illustrating a method for detecting the presence of a conductive object at power-up according to one embodiment of the present invention.

FIG. 7 is a flow diagram illustrating a method for detecting the presence of a conductive object at power-up according to one embodiment of the present invention. In one embodiment the process 700 is used to determine whether a capacitive-sensing button, such as button 210 of FIG. 2, is pressed when computing device 200 is powered-up.

At block 701, process 700 calculates an offset value for each of the target and secondary touch-sensor buttons. The offset value is an adjustment to the raw count value of a sensor such that the sensor will have an adjusted count value equal to all other sensors. Normally, the readings of sensors may vary in small amounts under the same environmental conditions. These variances may be attributable to various factors, for example, manufacturing inconsistencies. The offset value of a sensor accounts for these variances and when applied to the raw count of a sensor equalizes the count with that of other sensors. In one embodiment, the offset value for a sensor is calculated by taking the raw count of the sensor and finding a difference between that raw count and the raw count of a control sensor under the same environmental conditions. The offset value is the difference between the raw counts of the sensor and the control sensor. For example, if the raw count of the sensor is 815 and the raw count of the control sensor is 800, then the offset value for the sensor is −15. In an alternative embodiment, the offset value for a sensor is calculated by taking the raw count of the sensor and finding a difference between that raw count and a chosen value. For example, if the raw count for the sensor is 815 and the chosen value is 900, the offset value is +85. In alternative embodiments, the offset value is calculated using other methods. The offset value for each sensor may be unique with the result being that when two sensors are placed in the same environmental conditions and their respective offset values are applied, the count values for each sensor are approximately equal.

At block 702, process 700 samples the raw capacitance values of the target and secondary touch-sensor buttons. The raw capacitance value of a button may be determined by taking a raw count of the capacitive-sensor associated with the button. At block 703, process 700 applies the offset value of the target touch-sensor button to the raw capacitance value of the target touch-sensor button to generate a baseline capacitance value. The previously calculated offset value is added to the raw capacitance value of the target touch-sensor button resulting in a target baseline capacitance value.

At block 704, process 700 applies the offset value of each secondary touch-sensor button to the raw capacitance value of each secondary touch-sensor button. The offset value may be applied using simple addition with the result being a baseline capacitance value for each secondary touch-sensor button. At block 706, process 700 determines the difference between the target baseline capacitance value determined at block 703 and the lowest secondary baseline capacitance value. The lowest secondary baseline capacitance value is used in case the conductive object (e.g., a finger) affects more than one of the touch-sensor buttons. Using the lowest secondary baseline capacitance value ensures that the target baseline capacitance value is compared to that of a touch-sensor button that was not affected by the conductive object or was at least minimally affected. In this embodiment, the lowest secondary baseline capacitance value is representative of the secondary baseline capacitance value as described with respect to blocks 602 and 603 of FIG. 6.

At block 710, process 700 compares the difference between the target baseline capacitance value and the secondary baseline capacitance value to a button threshold value. The button threshold value is a count value that is greater than the baseline value by an amount sufficient to indicate the presence of a conductive object. The button threshold value is set such that the presence of a conductive object (e.g., a finger) on one of the capacitive-sensing buttons would raise the raw count for that button above the button threshold.

At block 711, if the difference in baseline capacitance values between the target and secondary touch-sensor buttons is greater that the button threshold, process 700 determines that the conductive object is present and may initiate some action. In one embodiment, the process causes the computing device to enter a diagnostic mode. In alternative embodiments, the process initiates some other action.

In an alternative embodiment, once the baseline capacitance value for each secondary touch-sensor button is generated at block 704, process 700 proceeds to block 707. At block 707, process 700 computes the average of the secondary baseline capacitance values. The average may be computed by adding up the baseline capacitance values of each secondary touch-sensor button and dividing by the total number of secondary touch-sensor buttons. At block 709, process 700 determines the difference between the target baseline capacitance value generated at block 703 and the average secondary baseline capacitance value calculated at block 707. In this embodiment, the average secondary baseline capacitance value is used as the secondary baseline capacitance value. Process 700 then proceeds to block 710 and 711, as described above.

In another alternative embodiment, once the target baseline capacitance value is generated at block 703, process 700 proceeds to block 705. At block 705, process 700 determines the average raw capacitance value and the average offset value for the secondary touch-sensor buttons. The average raw capacitance value may be computed by adding up the raw counts of each secondary touch-sensor button and dividing by the total number of secondary touch-sensor buttons. The average offset value may be computed by adding up the offset value of each secondary touch-sensor button and dividing by the total number of secondary touch-sensor buttons.

At block 708, process 700 applies the average secondary offset value to the average secondary raw capacitance value to generate an average secondary baseline capacitance value. The average secondary offset value may be applied using simple addition with the result being an average secondary baseline capacitance value for the secondary touch-sensor buttons. Process 700 then proceeds to blocks 709, 710 and 711 as discussed above.

In other alternative embodiments, process 700 may determine the secondary baseline capacitance value and offset values in other ways such as, for example, using ratios of the primary and secondary buttons or groups of buttons. In other alternative embodiments, process 700 may be applied using other touch-sensor devices in place of touch-sensor buttons, such as, for example, touch-sensor pads, touch-sensor sliders, or other non-mechanical switches.

In one embodiment, process 700 allows for determining whether a conductive object is present at power-up of the computing device without detecting when the conductive object is not present. Process 700 need not wait for the user to remove their finger from the target button in order to determine that the button was actually pressed at power-up.

Embodiments of the present invention include various operations. These operations may be performed by hardware components, software, firmware, or a combination thereof. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a machine-readable medium. These instructions may be used to program a general-purpose or special-purpose processor to perform the described operations. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); or another type of medium suitable for storing electronic instructions.

Additionally, some embodiments may be practiced in distributed computing environments where the machine-readable medium is stored on and/or executed by more than one computer system. In addition, the information transferred between computer systems may either be pulled or pushed across the communication medium connecting the computer systems.

The digital processing device(s) described herein may include one or more general-purpose processing devices such as a microprocessor or central processing unit, a controller, or the like. Alternatively, the digital processing device may include one or more special-purpose processing devices such as a digital signal processor (DSP), an application specific integrated circuit (ASIC), a field programmable gate array (FPGA), or the like. In an alternative embodiment, for example, the digital processing device may be a network processor having multiple processors including a core unit and multiple microengines. Additionally, the digital processing device may include any combination of general-purpose processing device(s) and special-purpose processing device(s).

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader scope of the invention as set forth in the appended claims. The specification and drawings are, accordingly, to be regarded in an illustrative sense rather than a restrictive sense.

What is claimed is:

1. A method comprising:
   powering up an electronic system;
   measuring a first capacitance value of a target sensing device within a certain time period during the powering up of the electronic system, wherein a baseline value for the target sensing device is not established prior to the measuring the first capacitance value;
   measuring a second capacitance value of a secondary sensing device within the certain time period;

determining that a conductive object was present at the target sensing device within at least the certain time period prior to establishing the baseline value for the target sensing device, wherein the determining comprises calculating a difference between the first capacitance value of the target sensing device and the second capacitance value of the secondary sensing devices exceeds a button threshold.

2. The method of claim 1, wherein the target sensing device comprises a target touch-sensor button and the secondary sensing device comprises a secondary touch-sensor button.

3. The method of claim 2, further comprising calculating an offset value for the target touch-sensor button and for the secondary touch-sensor button, wherein calculating the offset value comprises determining an offset value for the target touch-sensor button and for the secondary touch-sensor button, such that when the offset value is added to the first capacitance value, an adjusted capacitance value for the target touch-sensor button and the second capacitance value of the secondary touch-sensor button is approximately equal.

4. The method of claim 3, further comprising establishing a baseline capacitance value of the target touch-sensor button, wherein the establishing the baseline capacitance value comprises applying the offset value of the target touch-sensor button to the first capacitance value of the target touch-sensor button.

5. The method of claim 3, further comprising establishing a second baseline capacitance value of the secondary touch-sensor button, wherein the establishing the second baseline capacitance value comprises determining a lowest baseline capacitance value of the secondary touch-sensor button and of other secondary touch-sensor buttons.

6. The method of claim 3, further comprising establishing a second baseline capacitance value of the secondary touch-sensor button, wherein the establishing the second baseline capacitance value comprises computing an average baseline capacitance value of the secondary touch-sensor button and of other secondary touch-sensor buttons.

7. The method of claim 1, further comprising, when the conductive object is present at the power-up, updating a status register.

8. The method of claim 1, further comprising, when the conductive object is present at the target sensing device within the certain time period, sending an interrupt request to a host processor.

9. The method of claim 1, further comprising after the certain time period of the powering up of the electronic system, establishing the baseline value of the target sensing device when the conductive object is not present at the target sensing device.

10. The method of claim 9, wherein establishing the baseline value of the target sensing device comprises:
  determining that the conductive object is no longer present at the target sensing device during a second time period after the certain time period; and
  measuring a third capacitance value of the target sensing device when the conductive object is not longer present at the target sensing device.

11. An electronic system comprising:
  A processing device configured to receive signals from a target sensing device and one or more secondary sensing devices, the processing device to determine at power-up of the electronic system that a conductive object is present at the target sensing device within a certain time period during the power-up by determining that a difference between a first capacitance value of the target sensing device and a second capacitance value of one or more secondary sensing devices exceeds a button threshold prior to establishing a baseline value for the target sensing device.

12. The apparatus of claim 11, wherein the processing device comprises one or more capacitance sensors coupled to the target sensing device, and wherein the one or more capacitance sensors are configured to measure a capacitance on the target sensing device to detect the presence of the conductive object on the target sensing device.

13. The apparatus of claim 11, wherein the signals received from the target sensing device represent the capacitance measured on the target sensing device.

14. The apparatus of claim 11, wherein the target sensing device comprises a target touch-sensor button and the one or more secondary sensing devices are one or more secondary touch-sensor buttons.

15. The apparatus of claim 14, wherein the processing device is configured to:
  measure the first capacitance value of the target touch-sensor button; and
  measure the second capacitance value of the secondary touch-sensor buttons.

16. The apparatus of claim 11, further comprising an interface line coupled between the processing device and a host processor, the interface line to send instructions to update a status register on the host processor when the conductive object is present at the power-up.

17. An electronic system comprising:
  means for powering up the electronic system during a first time period;
  means for measuring a first capacitance value of a target sensing device within the first time period, wherein a baseline value for the target sensing device is not established prior to the measuring the first capacitance value;
  means for measuring a second capacitance value of a secondary sensing device within the first time period;
  means for determining that a conductive object was present at the target sensing device within at least the certain time period prior to establishing the baseline value for the target sensing device, wherein the means for determining comprises calculating that a difference between the first capacitance value of the target sensing device and the second capacitance value of the secondary sensing devices exceeds a button threshold.

18. The electronic system of claim 17, wherein the means for determining during the first time period occurs before a second time period begins, the second time period comprising detecting when the conductive object is no longer present.

* * * * *